UNITED STATES PATENT OFFICE.

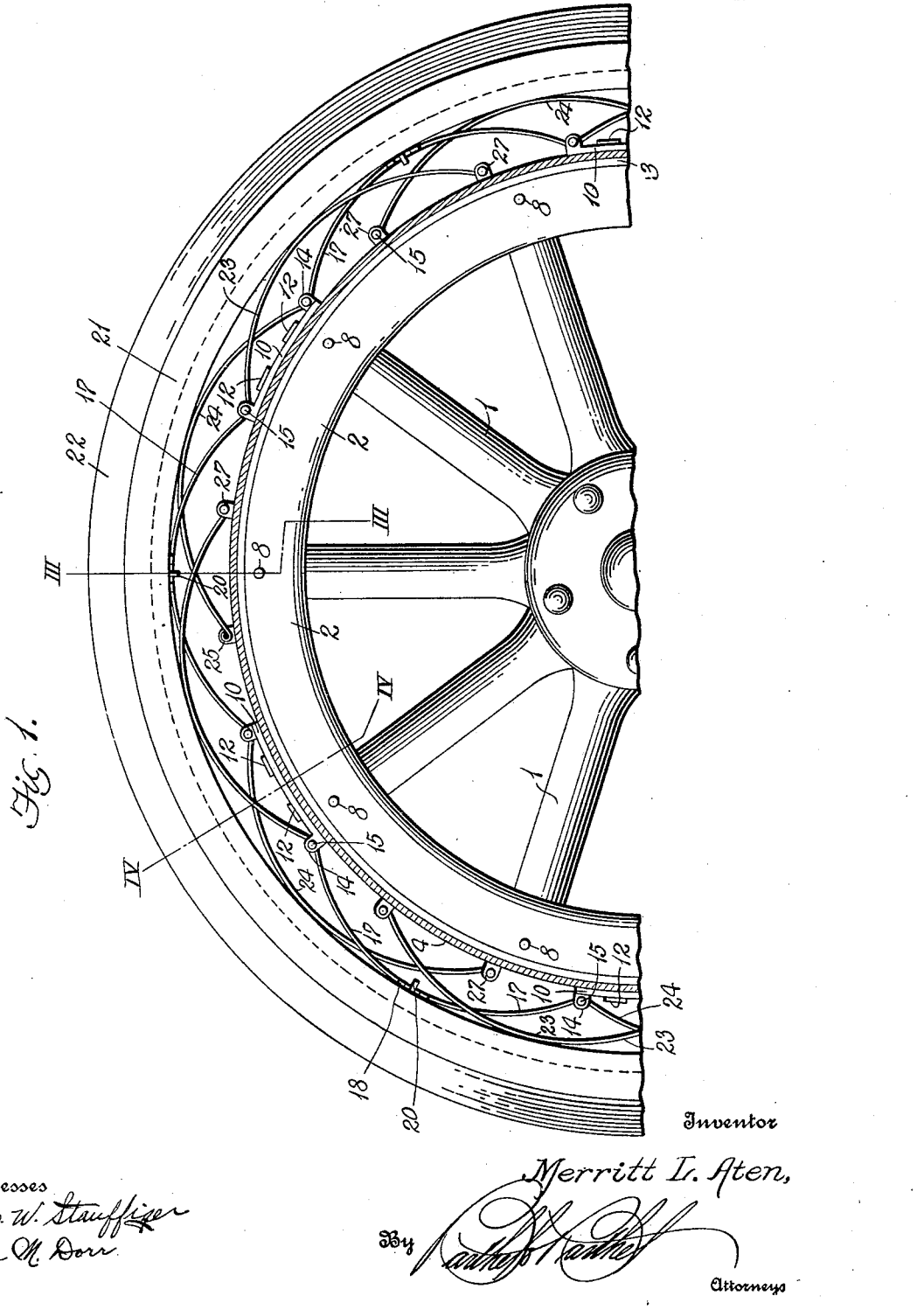

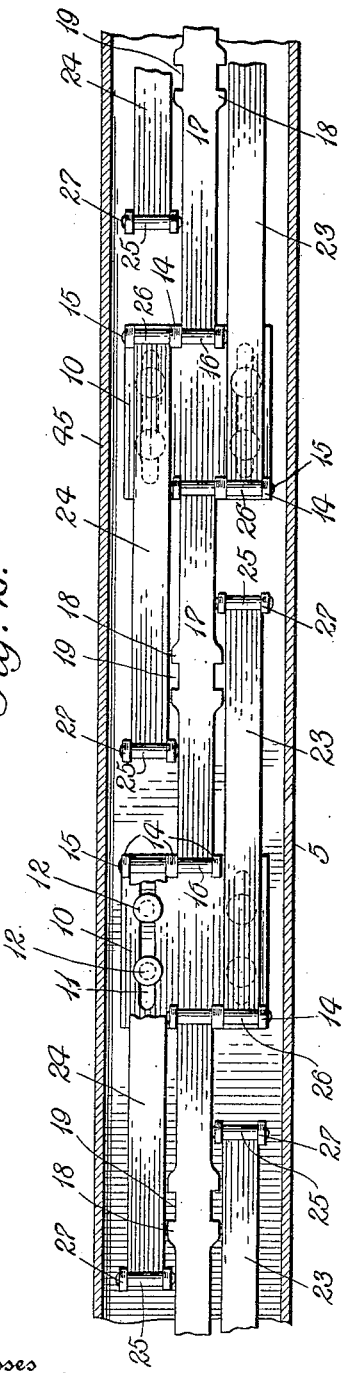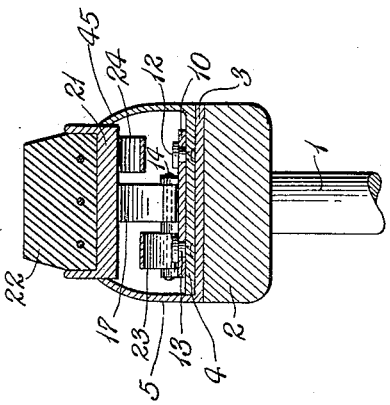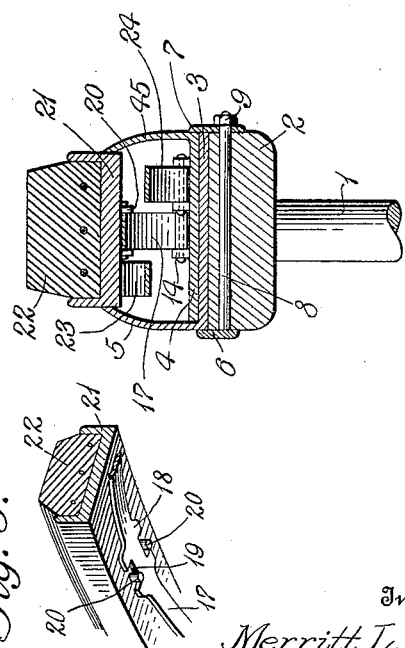

MERRITT L. ATEN, OF JACKSON, MICHIGAN, ASSIGNOR OF ONE-FOURTH TO A. R. PURCELL, OF JACKSON, MICHIGAN.

SPRING-WHEEL.

1,117,152.   Specification of Letters Patent.   Patented Nov. 17, 1914.

Application filed December 20, 1913.   Serial No. 808,016.

*To all whom it may concern:*

Be it known that I, MERRITT L. ATEN, a citizen of the United States of America, residing at Jackson, in the county of Jackson and State of Michigan, have invented certain new and useful Improvements in Spring-Wheels, of which the following is a specification, reference being had therein to the accompanying drawings.

This invention relates to vehicle wheels and more particularly to that type wherein resilient elements are interposed between the felly of the wheel and the tire thereof for cushioning the felly relatively to the tire, thereby obviating the necessity of using pneumatic tubes for cushioning purposes.

The objects of my invention are to provide a wheel of the above type with resilient articulated and circumferentially arranged members constituting a spring action adapted to increase the road worthiness of the wheel, and to provide resilient tire supporting members that are housed upon the felly of the wheel and protected against stone bruise, dust and such foreign matter that might impair the resiliency of said members.

Further objects of my invention are to provide a novel spring action wherein a plurality of resilient members are connected together in a manner as hereinafter set forth, whereby a plurality of the members coöperate in sustaining a load, and to provide a strong and durable wheel that can be advantageously used in connection with motor driven vehicles.

My invention will be hereinafter specifically described and then claimed, and reference will now be had to the drawings, wherein, Figure 1 is a side elevation of a portion of a vehicle wheel, partly in section; Fig. 2 is a developed view of a portion of the wheel, showing the spring elements grouped for the periphery of a wheel; Fig. 3 is a cross sectional view taken on the line III—III of Fig. 1; Fig. 4 is a similar view taken on the line IV—IV of Fig. 1, and Fig. 5 is a perspective view of a portion of the tire illustrating one of the coupling members of the spring action.

In describing my invention by aid of the drawings above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings, 1 denotes radiating spokes supporting a felly 2 and arranged circumferentially of the felly is the lateral flange 3 of an inner circular side plate 5. The flange 3 can be shrunk or otherwise mounted upon the felly, and detachably mounted upon the flange 3 is the lateral flange 4 of an outer circular side plate 45, the side plates 5 and 45 having the peripheral edges thereof directed inwardly, as best shown in Fig. 3, for a purpose that will hereinafter appear.

Engaging the inner side plate 5 are securing members 6, carried by transverse tie rods or bolts 8 mounted in the felly 2. Detachably mounted upon the tie rods or bolts 8 are securing members 7 that engage the outer side plate 45, said members being retained in engagement with the side plate by nuts 9 or other fastening means. The elements 6 to 9 inclusive constitute a conventional form of fastening means for retaining the side plates 5 and 45 upon the felly 2.

Movably mounted upon the lateral flange 4 of the outer side plate 45 are a plurality of equally spaced slides 10 having parallel longitudinal slots 11. The slides 10 are retained in engagement with the flange 4 by the heads 12 of rivets 13, said rivets extending through the slots 11 into the flange 4 of the outer side plate 45. The slides 10 have the ends thereof, intermediate the side edges, provided with sets of apertured lugs 14 and pivotally mounted between the lugs of each set by rivets or pins 15 are the barrels 16 of resilient bowed coupling members 17. The coupling members 17, intermediate their ends, have lateral side extensions 18 providing notches 19 to receive inwardly projecting pins 20, carried by a channel-shaped rim 21, which is provided with a tire 22. The rim 21 is movably supported between the peripheral edges of the side plates 5 and 45 and the rim 21 can be of any desired cross sectional area for holding a suitable tire.

Associated with the coupling members 17 are bowed resilient members 23 and 24, said members being arranged in parallelism with the coupling members 17. The members 23 and 24 have the ends thereof provided with barrels 25 and 26. The members 23 and 24 extend longitudinally above the slides 10 and the barrels 26 therof are pivotally connected to the slides 10 by the same rivets or pins 15 holding the coupling members 17. The barrels 25 of the members 23 and 24 are pivotally mounted between sets of lugs 27, carried by the lateral flange 4 of the side plate 45.

The members 17, 23 and 24 are so disposed that the bowed portions thereof bear against the inner side of the rim 21 and movably support said rim between the edges of the side plates 5 and 45, whereby the felly 2 can shift within the rim 21. By reference to Fig. 2, it will be observed that the slides, 10 can shift upon the flange 4 and consequently change the curvature of the resilient members. When pressure is brought to bear upon either of the members 17 the slides 10 connected to the ends of said members are shifted, but the movement of the slides 10 brings into action one of the resilient members 23 or 24 connected thereto and in consequence of coupling the slides together in the manner as shown in Fig. 2, the resilient members all coöperate in distributing pressure brought to bear at any point upon the tire 22.

A slide 10, resilient members 23 and 24, and coupling members 17 constitute a spring action for cushioning purposes, which permits of a cushioned element shifting relatively to the elements supporting the spring action, and when the resilient members are brought into play by a movement of the slide in one direction, the curvature of one coupling member is increased and the curvature of the other coupling member decreased, this also being true in connection with the resilient members connected to the slide at the side of the coupling members. It is therefore apparent that the movement of the slide 10 depends upon the resiliency of the members connected thereto, and with the members arranged in the stepped or staggered relation, shown in Fig. 2, the circumferentially arranged spring actions provide substantially a continuous yieldable bearing surface for the rim 21.

What I claim is:—

1. In a vehicle wheel, a felly, a rim, bowed resilient members arranged in parallel overlapped relation and supporting said rim relatively to said felly, and means circumferentially of said felly for coupling ends of said members with the ends of some of said members coupled in alinement and the ends of other members coupled in staggered relation, whereby said members coöperate in supporting said rim.

2. A spring action for yieldably supporting the periphery of a wheel relatively to the axis thereof, comprising a slide, and bowed resilient members arranged in parallel over-lapped relation and connected to said slide with some of said connection alining and other connections staggered, whereby all of said members are brought into action by a movement of said slide.

3. A spring action for yieldably supporting the periphery of a wheel relatively to the axis thereof, comprising slides, alining resilient coupling members connecting said slides, and resilient staggered members having ends thereof anchored relatively to said slides and ends thereof extending over and connected to said slides whereby all of said members are brought into action by a movement of said slide.

4. In a vehicle wheel, a felly, a rim, slides movable relatively to said felly, resilient bowed coupling members connecting said slides intermediate the side edges thereof, resilient bowed members arranged at the sides of said coupling members and having ends thereof held by said felly and other ends thereof extending across and connected to said slides by the same means connecting said coupling members to said slides, and side plates carried by said felly for movably supporting said rim upon said resilient members.

In testimony whereof I affix my signature in presence of two witnesses.

MERRITT L. ATEN.

Witnesses:
 OTTO F. BARTHEL,
 ANNA M. DORR.

Copies of this patent may be obtained for five cents each, by addressing the "Commissioner of Patents, Washington, D. C."